United States Patent
Arata (10) Patent No.: US 6,227,498 B1
(45) Date of Patent: May 8, 2001

(54) SINGLE SURFACE INDEPENDENT AIRCRAFT CONTROL

(75) Inventor: Allen A. Arata, Hawthorne, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/311,072

(22) Filed: May 13, 1999

Related U.S. Application Data (63) Continuation-in-part of application No. 09/059,471, filed on Apr. 13, 1998, now Pat. No. 6,068,219.

(51) Int. Cl.$^7$ ............................................. B64C 3/44
(52) U.S. Cl. ......................... 244/219; 244/36; 244/130; 244/45 R
(58) Field of Search ..................... 244/198, 36, 219, 244/45 R, 90 R, 213–215, 130

(56) References Cited

U.S. PATENT DOCUMENTS

| | | | |
|---|---|---|---|
| 2,191,842 | * 2/1940 | Back | 244/90 R |
| 2,209,863 | * 7/1940 | Tupta | 244/90 R |
| 2,343,986 | 3/1944 | Luetholt | 244/44 |
| 2,665,085 | * 1/1954 | Crocombe et al. | 244/90 R |
| 3,109,613 | 11/1963 | Bryant et al. | 244/44 |
| 3,193,215 | 7/1965 | Dunham | 244/12 |
| 3,994,451 | 11/1976 | Cole | 244/44 |
| 4,026,500 | 5/1977 | Grow | 244/36 |
| 4,166,595 | 9/1979 | Ango | 244/20 |
| 4,171,787 | 10/1979 | Zapel | 244/219 |
| 4,230,295 | 10/1980 | Eppler | 244/213 |
| 4,247,066 | 1/1981 | Frost et al. | 244/219 |
| 4,651,953 | 3/1987 | Kim | 244/12.1 |
| 4,667,898 | 5/1987 | Greenhalgh | 244/46 |
| 4,865,275 | * 9/1989 | Thompson | 244/36 |
| 5,156,358 | 10/1992 | Gerhardt | 244/36 |
| 5,255,881 | 10/1993 | Rao | 244/199 |
| 5,503,351 | * 4/1996 | Vass | 2344/12.2 |
| 5,538,201 | 7/1996 | Gerhardt | 244/204 |
| 5,794,893 | * 8/1998 | Diller et al. | 244/219 |
| 5,839,698 | 11/1998 | Moppert | 244/217 |

FOREIGN PATENT DOCUMENTS

573411 * 6/1924 (FR) ..................................... 244/219

* cited by examiner

*Primary Examiner*—Galen L. Barefoot
(74) *Attorney, Agent, or Firm*—Terry J. Anderson; Karl J. Hoch, Jr.

(57) ABSTRACT

In accordance with the present invention, there is provided an aerodynamic control device for integrated use with an aircraft having an inboard lifting member. The inboard lifting member having a leading edge, a pair of opposing distal edges and a trailing edge. The control device is provided with a movable outboard member which extends substantially about the leading, distal and trailing edges of the inboard lifting member and is spaced apart therefrom. The outboard member is provided with a leading edge portion, a pair of opposing distal edge portions, and a trailing edge portion. The leading, distal, and trailing edge portions are movable in relation to the inboard lifting member to form an airfoil surface extending about the inboard lifting member and the outboard member for achieving aerodynamic control of the aircraft. The trailing edge portion has at least one deflectable segment which is vertically movable in relation to the leading and distal edge portions for achieving further aerodynamic control of the aircraft.

33 Claims, 6 Drawing Sheets

SINGLE SURFACE INDEPENDENT AIRCRAFT CONTROL

RELATED APPLICATIONS

This patent application is a continuation-in-part of U.S. application Ser. No. 09/059,471 entitled SINGLE SURFACE MULTI AXIS AIRCRAFT CONTROL, filed Apr. 13, 1998, now U.S. Pat. No. 6,068,219, the disclosure of which is incorporated herein by reference.

FIELD OF THE INVENTION

The present invention relates generally to aircraft aerodynamic control surfaces, and more particularly to an aircraft having an aerodynamic inboard lifting member and a outboard member which selectively move relative to the inboard lifting member.

BACKGROUND INVENTION

Conventional fixed winged aircraft are provided with a variety of aerodynamic control surfaces which include, for example, flaps, elevators, ailerons, trim tabs, and rudders. These control surfaces cooperatively operate to increase or decease lift over a given localized aerodynamic control surface for achieving pitch, yaw and roll control of the aircraft. Such control surfaces are used in both traditional winged aircraft and in modern stealthy designs, such as the delta wing and the F-117.

These control surfaces are typically rigid structures which are rotatably attached to the wings or body (i.e., aerodynamic lifting surfaces) of the aircraft in a hinge-like fashion. Operation of the control surfaces typically forms gaps and/or abrupt changes in surface contours at or about the hinge area. Such gaps and abrupt changes are undesirable for a number of reasons. The gaps and abrupt changes tend to increase the drag on the aircraft, give rise to the potentiality that foreign objects and/or debris may become caught thereat, and increase the radar signature of the aircraft.

In addition, conventional control surfaces are usually located at the trailing edges of the wings and fins of the aircraft. In order to operate the control surfaces, the associated actuators and supporting pneumatic piping and/or electrical wiring must also be housed at these locations. Because these locations are typically spatially constrained, assembly and subsequent maintenance of the control surfaces and their actuation mechanisms are complex and labor intensive operations.

It is therefore evident that there exists a need in the art for an aircraft aerodynamic control surface which mitigates gaps and abrupt surface contour changes, and mitigates aircraft radar cross section signature, reduces the complexity of assembly and maintenance operations associated with conventional control surface designs.

SUMMARY OF THE INVENTION

In accordance with the present invention, there is provided an aerodynamic control device for integrated use with an aircraft having an inboard lifting member. The inboard lifting member having a leading edge, a pair of opposing distal edges and a trailing edge. The control device is provided with a movable outboard member which extends substantially about the leading, distal and trailing edges of the inboard lifting member and is spaced apart therefrom. The outboard member is provided with a leading edge portion, a pair of opposing distal edge portions, and a trailing edge portion. The leading, distal, and trailing edge portions are movable in relation to the inboard lifting member to form an airfoil surface extending about the inboard lifting member and the outboard member for achieving aerodynamic control of the aircraft. The trailing edge portion has at least one deflectable segment which is vertically movable in relation to the leading and distal edge portions for achieving further aerodynamic control of the aircraft.

In the preferred embodiment of the present invention, the at least one deflectable segment comprises a pair of deflectable segments. In this respect, the inboard lifting member defines a longitudinal axis and the deflectable segments are symmetrically disposed about the longitudinal axis. The deflectable segments are sized and configured to move in opposing vertical directions and in the same direction.

Preferably, the control device is provided with a flexible transition section. The transition section extends between the inboard lifting member and the outboard member to form a relatively uninterrupted airfoil surface extending about the inboard lifting member and the outboard member for achieving desired aerodynamic control of the aircraft. The transition section may be formed of an elastomeric material. The transition section is attached to the outboard member and the inboard lifting surface in a fashion which does not produce any significant abrupt surface contour changes, such as steps or gaps. Thus, the airfoil surface is relatively continuous and smooth. As such, selective contouring of the airfoil surface, via movement of the outboard member relative to the inboard member and/or movement of the deflectable segment of the trailing edge portion of the outboard member, facilitates single surface aerodynamic control. Moreover, it is contemplated that such aerodynamic control may be generally independent with respect to specific axes of aircraft control (e.g., generally independent roll, yaw and pitch control).

Preferably, the aerodynamic control device is provided with a plurality of actuators mechanically coupling the outboard member to the inboard lifting surface for selectively moving the outboard member relative to the inboard lifting member. In addition, actuators may be engaged with the deflectable segments of the trailing edge portion for moving the segments relative to the rest of the outboard member. The actuators may be electrical, hydraulic and pneumatic devices and combinations thereof.

In the preferred embodiment of the present invention, the outboard member is an unitary uninterrupted member and laterally spans the inboard lifting member. Generally, the outboard member is substantially rigid and may be formed of non-metallic materials, such as a resin composite. A degree of flexure of the outboard member is contemplated. In this regard, the outboard member may formed of a material capable of sustaining an elastic strain of at least 5 percent for facilitating relative movement of the deflectable segments. In contrast, the transition section comprises an elastomeric material.

Advantageously, the aircraft in which the present invention is practiced may be delta-shaped. Other aircraft shapes are contemplated including more traditional designs having a fuselage with fixed wings. Other embodiments of the present invention include incorporating the above described aerodynamic control device into an aircraft wing and fuselage as well as an all wing type aircraft. The wings of the aircraft are provided with wing tips. The distal edges of the inboard lifting member and the distal edge portions of the outboard member are disposed at the wing tips.

In addition, there is provided a method of aerodynamic control of an aircraft comprising the initial step providing an aircraft with an aerodynamic inboard lifting member having a leading edge, a distal edge and a trailing edge as disclosed above. An airfoil surface is formed by positioning the movable outboard member extending substantially about the leading, distal and trailing edges of the inboard lifting member and spaced apart therefrom.

Aerodynamic control of the aircraft is achieved by selectively moving the outboard member relative to the inboard lifting member thereby contouring the airfoil surface for achieving aerodynamic control of the aircraft. Further, at least one deflectable segment of the trailing edge portion is selectively moved relative to the leading and trailing edge portions thereby further contouring the airfoil surface for achieving aerodynamic control of the aircraft. As mentioned above, preferably a pair of deflectable segments is provided. The deflectable segments are symmetrically disposed about a longitudinal axis of the inboard lifting member.

Pitch control of the aircraft may be achieved by moving the leading and trailing edge portions of the outboard member in opposing directions relative to the inboard lifting member along a vertical axis of the inboard lifting member. As such, the outboard member is rotated about an axis which is parallel to a lateral axis of the inboard lifting member. Additionally pitch control may be achieved by a symmetrically disposed deflectable segments in the same relative vertical direction.

In addition, roll and yaw control may be achieved by rotating the outboard member about the longitudinal axis of the inboard lifting member. Further, roll control of the aircraft may by achieved by moving the deflectable segments in opposing relative vertical directions. As such, yaw control which is generally independent of roll control of the aircraft may be achieved by cooperatively moving the outboard member relative to the inboard lifting member and deflectable segments of the trailing edge portion of the outboard member. In this regard, the outboard member is rotated about a longitudinal axis of the inboard lifting member. As respective ones of the pair of deflectable segments are generally disposed adjacent respective ones of the distal edge portions, the deflectable segments are generally moved in a direction opposite that of the adjacentmost distal edge portion for causing rolling moments which tend to counteract rolling moments produced by the rotation of the outboard member. As a result, overall yaw control may be achieved which is generally independent of roll control of the aircraft.

Based on the foregoing, the present invention mitigates the inefficiencies and limitations associated with prior art aerodynamic aircraft control systems. Importantly, because the transition section joins the outboard member and the inboard lifting member in a smooth continuous manner, undesirable gaps and abrupt surface contour changes are mitigated. Thus, the gaps and abrupt changes in the aircraft surface contours occurring about conventional control surfaces are mitigated. As such, the present invention tends to decrease drag, reduce or eliminate the potentiality of foreign objects becoming caught, and decrease the radar cross section signature of the aircraft, in comparison to conventionally controlled aircraft.

In addition, conventional control surfaces are usually located at the trailing edges of the wings and fins of the aircraft. In order to operate the control surfaces, the associated actuators and supporting pneumatic piping and/or electrical wiring must be housed at these spatially constrained locations. Assembly and maintenance of the outboard member integrated into the aircraft of the present invention are relatively simple in comparison to the complex and labor intensive operations associated with conventional control surfaces due to their integration into confined spaces. It is contemplated that the transition section is removable, thereby allowing free access from the exterior of the aircraft to the actuators contained therein.

Advantageously, the aircraft constructed in accordance with the present invention tends to mitigate the effects of lightning strikes or other electrical phenomenon contacting the aircraft. In aircraft having conventional airfoil surfaces (i.e., elevators, trim tabs, etc.) upon being struck by electromagnetic waves, the electrical discharge tends to be concentrated at various regions about the aircraft. This is due in part to the discontinuous nature of the airfoil surfaces with respect to their integration with the rest of the aircraft. Such concentrations have the potential for damaging onboard electronic equipment. The aerodynamic control device of the present invention, however, has relatively few component parts which are smoothly integrated with the rest of the aircraft. Additionally, the outboard member is spread about a significant portion of the aircraft, especially in the case where it is of a unitary uninterrupted design, and distributes electrical discharge rather than locally concentrating electrical discharge.

Accordingly, the present invention represents a significant advance in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 8:
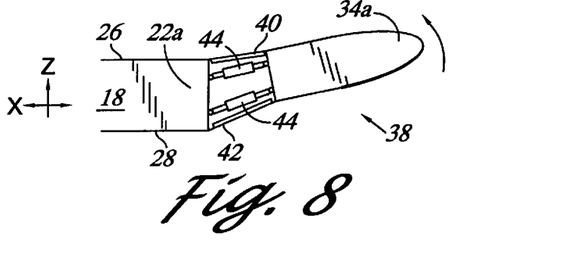
FIG. 8 is an enlarged partial cross-sectional view of the aircraft as shown in FIG. 5 along the B—B axis with the outboard member rotated counter clockwise about the longitudinal Y-axis.
Figure 9:
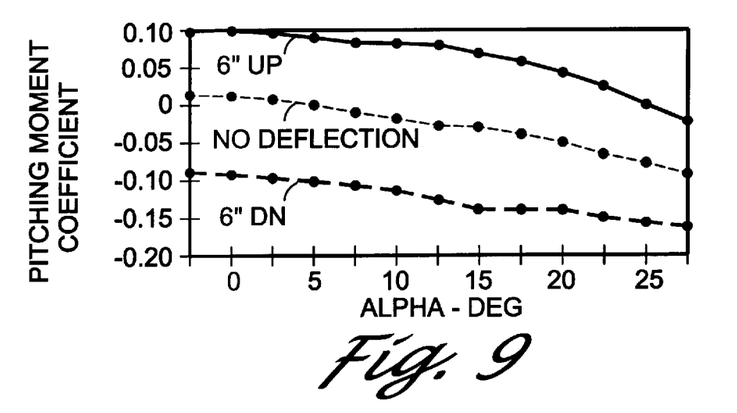
FIG. 9 is a graph representing pitching moment coefficient data associated with an exemplar embodiment of the present invention.
Figure 10:
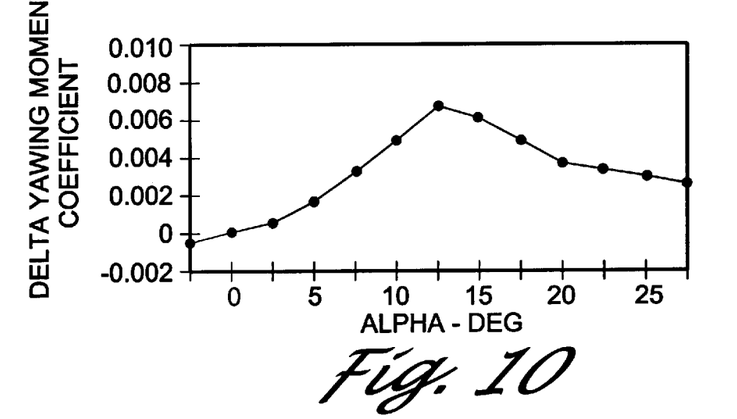
FIG. 10 is a graph representing yawing moment coefficient data associated with an exemplar embodiment of the present invention.
Figure 11:
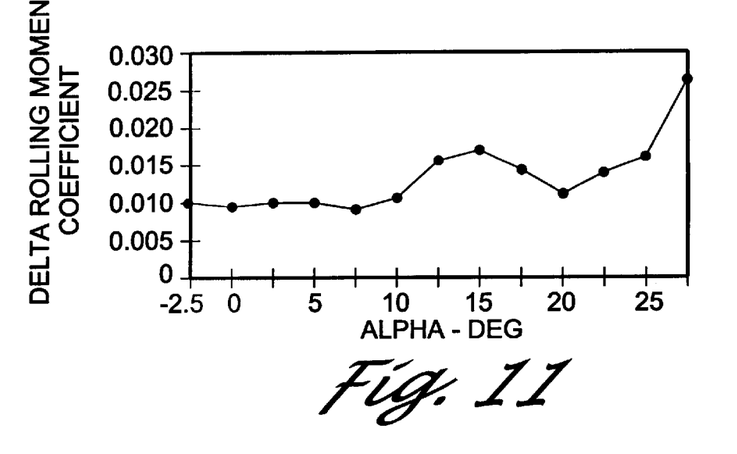
FIG. 11 is a graph representing rolling moment coefficient data associated with an exemplar embodiment of the present invention.

Referring now to the drawings wherein the showings are for purposes of illustrating a preferred embodiment of the present invention only, and not for purposes of limiting the same, FIGS. 1–8 and 12–18 illustrate an aerodynamic control device which is constructed in accordance with the present invention. As will be described in more detail below, the aerodynamic control device is integrated with an aircraft and is provided with an outboard member for aerodynamic control of the aircraft. In addition, FIGS. 9–11 present test data associated with an exemplar embodiment of the present invention.

In accordance with the present invention, referring now to FIGS. 1–8, there is provided an aerodynamic control device 10 for integrated use with an aircraft 12 having an inboard lifting member 18. The inboard lifting member 18 is provided with an upper skin 26 and a lower skin 28. The inboard lifting member is further provided with a leading edge 20, a pair of opposing distal edges 22a–b, and a trailing edge 24.

The control device 10 is provided with a movable outboard member 30 which extends substantially about the leading, distal and trailing edges 20, 22a–b, 24 of the inboard lifting member 18 and is spaced apart therefrom. The outboard member 30 is provided with leading, distal and trailing edge portions 32, 34a–b, 36. The leading, distal and trailing edge portions 32, 34a–b, 36 are collectively movable in unison relative to the inboard lifting member 18. Preferably, the control device 10 is further provided with a flexible transition section 38 having upper and lower surfaces 40, 42. The upper surface 40 of the transition section 38 extends between the outboard member 30 and the upper skin 26 of the inboard lifting member 18. The lower surface 42 of the transition section 38 extends between the outboard member 30 and the lower skin 28 of the inboard lifting member 18. Thus, the outboard member 30 is vertically interposed between the upper and lower skins 26, 28 of the inboard lifting member 18. The outboard member 30 is attachable to the inboard lifting member 18 such that the leading, distal and trailing edge portions 32, 34a–b, 36 are vertically movable in an uniform direction relative to the inboard lifting member 18.

The aircraft 12 defines a lateral axis, denoted X, and the outboard member 30 may rotate about this axis. The leading and trailing edge portions 32, 36 are vertically movable in opposing directions relative to the inboard lifting member 18. Such vertically opposing movement rotates the outboard member 30 about the X-axis. Similarly, the aircraft 12 defines a longitudinal axis, denoted Y, and the opposing distal edge portions 34a–b of the outboard member 30 are vertically movable in opposing directions relative to the inboard lifting member 18. Such vertically opposing movement rotates the outboard member 30 about the Y-axis.

The upper and lower skins 26, 28 of the inboard lifting member 18, the upper and lower surfaces 40, 42 of the transition section 38, and the outboard member 30 collectively define a relatively continuous airfoil surface. This airfoil surface may be selectively contoured via the movement of the outboard member 30 relative to the inboard lifting member 18 for achieving desired aerodynamic control of the aircraft 12. The transition section 38 is attached to the outboard member 30 and the inboard lifting member 18 in a fashion which does not produce any significant abrupt surface contour changes, such as gaps. Thus, the airfoil surface is relatively continuous and smooth in comparison to prior art aerodynamic control devices, such as flaps and rudders. Selective contouring of the airfoil surface, via outboard member movement, allows for pitch, yaw and roll control of the aircraft 12. Therefore, it is contemplated that the present invention facilitates single surface multi-axis aircraft control.

Importantly, as further discussed below, the trailing edge portion 36 of the outboard member 30 may flex or bend with respect to the leading and distal edge portions 32, 34. Such flexure or deflection facilitates further selective manipulation of the airfoil surface for achieving aerodynamic control of the aircraft 12. In particular, the trailing edge portion 36 is preferably provided with a pair of deflectable segments 52a–b which are configured to move vertically with respect to the leading and distal edge portions 32, 34 as well as the rest of the trailing edge portion 36.

In the preferred embodiment of the present invention, the aerodynamic control device 10 is provided with a plurality of actuators 44 which mechanically couple the outboard member 30 to the inboard lifting member 18 for selectively moving the outboard member 30 relative to the inboard lifting member 18. Preferably, the actuators 44 carry the majority of the loads associated with supporting the outboard member 30. Thus, the transition section 38 carries little or no loads associated with the outboard member 30. In addition, the actuators 44 also facilitate movement of the deflectable segments 52a–b with respect to the leading and distal edge portions 32, 34 as well as the rest of the trailing edge portion 36. The actuators 44 are selected from those well known to one of ordinary skill in the art and may be electromechanical, hydraulic, pneumatic devices, for example. In addition, one of ordinary skill in the art will recognize suitable methods of attachment, placement and configuring of the actuators 44.

Preferably, the outboard member 30 is substantially rigid and formed of non-metallic materials, such as a resin composite. A degree of flexure of the outboard member 30 is contemplated. As one of ordinary skill in the art can appreciate, nearly all materials can sustain some degree of elastic deformation. In this respect, the outboard member 30 is formed of a material capable of sustaining an elastic strain of at least 5 percent for facilitating the deflection of the deflectable segments 52a–b of the trailing edge portion 36. It is contemplated that the outboard member 30 need not be formed of a single material, and that selected portions thereof may vary in material type each having differing modulus of elasticity associated therewith. The particular material types used for the outboard member 30 is contemplated to be selected from those well known to one of ordinary skill in the art.

In contrast to the outboard member 30, the transition section 38 comprises an elastomeric material. Preferably, the material should be flexible, and yet durable to withstand the conditions encountered during flight. It is contemplated that the material is chosen from those well known to one of ordinary skill in the art and, for example, may be rubber or silicon. In the preferred embodiment, upper and lower surfaces 40, 42 of the transition section 38 are removable, thereby allowing free access from the exterior of the aircraft 12 to the actuators 44 contained therein. The method of attachment of the transition section 38 is chosen from those well known to one of ordinary skill in the art.

In one preferred embodiment, the outboard member 30 is effectively constructed to form a relatively unitary uninterrupted member and laterally spans the width of the inboard lifting member 18. Although, in the embodiments depicted in FIGS. 1–8 and 13–18, the outboard member 30 extends completely around the inboard lifting member 18, the outboard member 30 does not have to completely circumscribe the inboard lifting member 18 in this manner. In addition, although the outboard member 30 is depicted as a single member, it is contemplated that the outboard member 30 may be formed of several components which act cooperatively. In either embodiment, it is contemplated that the actuators 44 control the movement(s) of the outboard member 30. Although not shown, in practice, the actuators 44 communicate with and are commanded by a central control device 48, which may take the form of a computer processor for example. The central control device 48 would be connected to a set of pilot controls 50.

Figure 12:
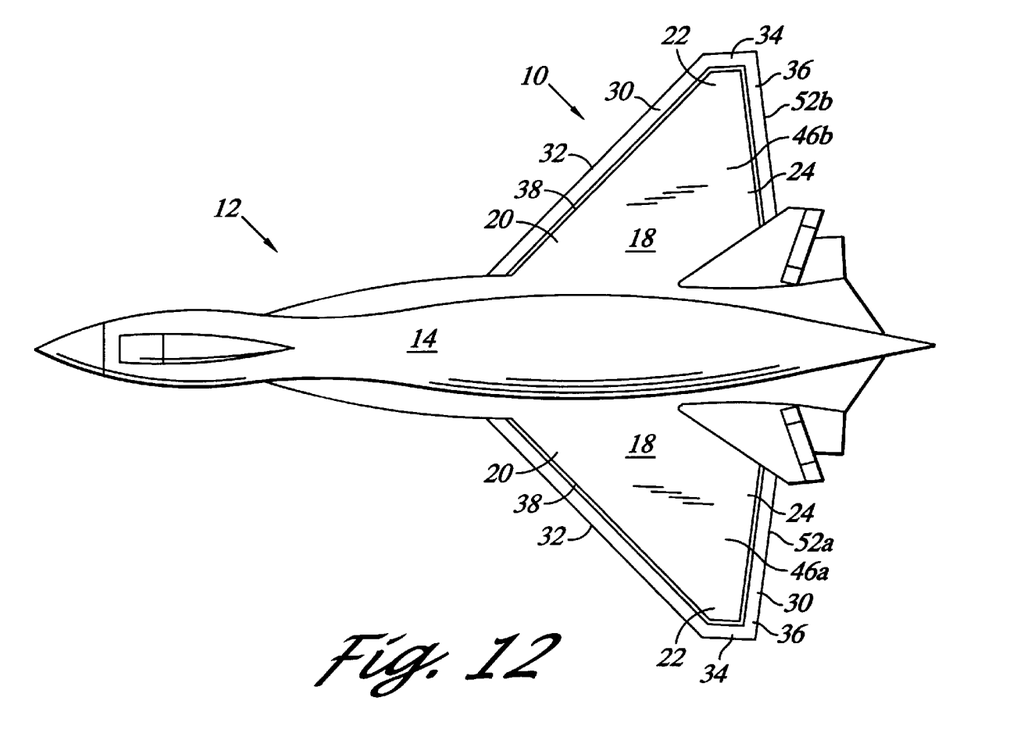
FIG. 12 is a top view of an alternative embodiment of the present invention.

As can be seen, in the embodiment of the present invention depicted in FIGS. 1–8 and 13–18, the inboard lifting member 18 is delta-shaped. As can be seen the leading edges 20a, 20b are angularly disposed. The leading edges 20a, 20b blend with the distal edges 22a, 22b and the distal edges 22a, 22b blend with the trailing edges 24a, 24b. Other aircraft shapes are contemplated, including those having a more traditional fuselage with fixed wing shape. FIG. 12 depicts an alternative embodiment of the present invention, in the case of a traditional design having a fuselage 14 with fixed wings 46a–b. The each of the wings 46a–b are provided with an inboard lifting member 18. An outboard member 30 extends substantially about each inboard lifting member 18. In such an embodiment, it is contemplated that the each of the outboard members 30 could pass through the fuselage 14 to form a unitary uninterrupted member. While, the outboard member 30 is shown on the wings 16, the outboard member may be integrated with other aerodynamic lifting surfaces, such as tails and canards, for example.

Figure 1:
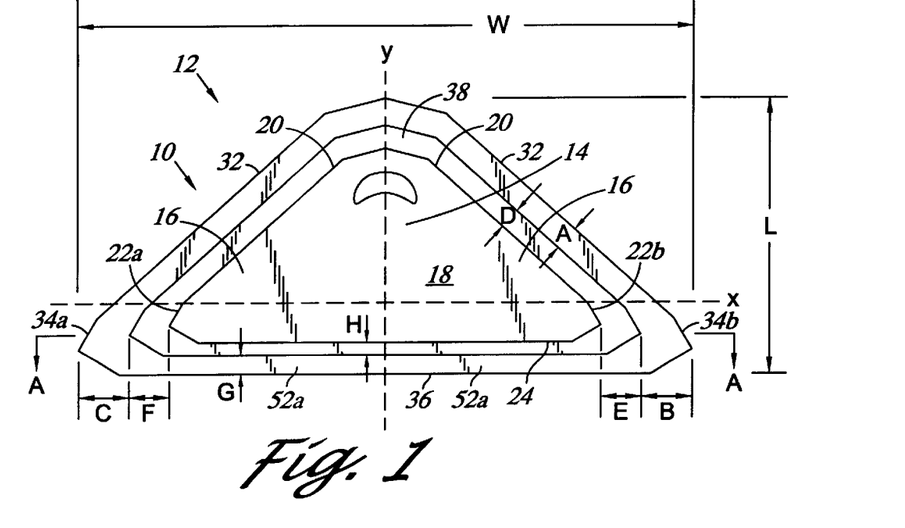
FIG. 1 is a top view of an embodiment of the aerodynamic control device of the present invention as integrated with an aircraft.
Figure 2:
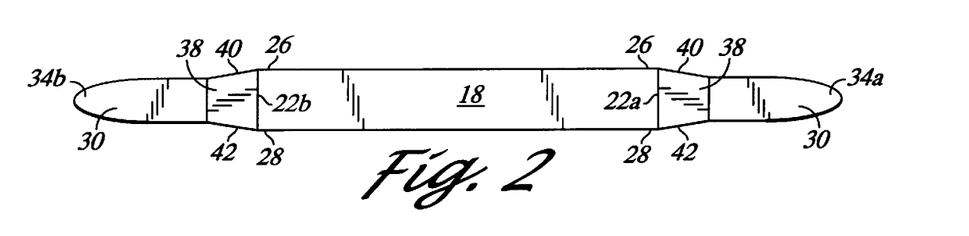
FIG. 2 is a cross-sectional view of the aircraft depicted in FIG. 1 along axis A—A with the outboard member in an undeflected state.
Figure 3:
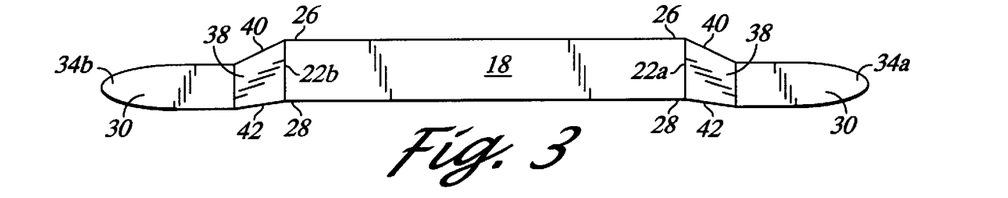
FIG. 3 is a cross-sectional view of the aircraft depicted in FIG. 1 along axis A—A with the outboard member moved vertically downward.
Figure 6:
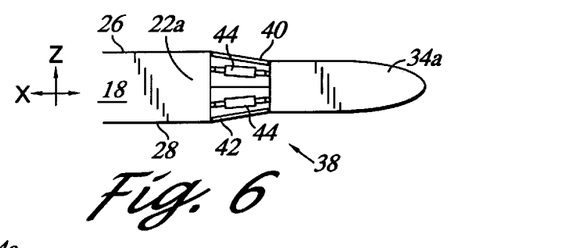
FIG. 6 is an enlarged partial cross-sectional view of the aircraft as shown in FIG. 5 along the B—B axis with the outboard member in an undeflected state.
Figure 7:
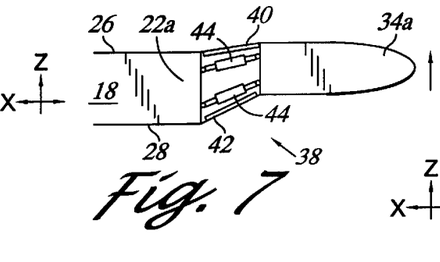
FIG. 7 is an enlarged partial cross-sectional view of the aircraft as shown in FIG. 5 along the B—B axis with the outboard member moved vertically upward.

Referring now to FIGS. 2 and 6, the outboard member 30 is shown in an undeflected state. Likewise, the upper and lower surfaces 40, 42 of the transition section 38 are shown in an unflexed state. The outboard member 30 may be uniformly vertically moved relative to the inboard lifting member 18 in order to achieve in pitch control of the aircraft 12. FIG. 3 depicts the outboard member 30, which includes the leading, distal and trailing edge portions 32, 34a–b, 36, deflected downward along the Z-axis. FIG. 7 depicts the outboard member 30 deflected upward along the Z-axis. The aircraft 12 defines a lateral axis (X-axis) and the outboard member 30 may be rotated about this axis. Thus, the outboard member 30 may be rotated forward and backward. This rotational movement of the outboard member 30 also results in pitch control of the aircraft 10.

Figure 4:
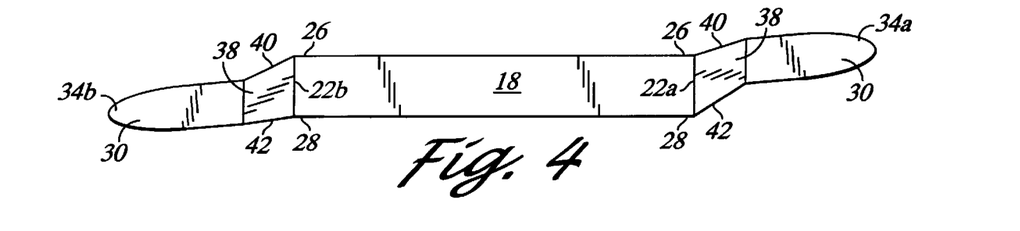
FIG. 4 is a cross-sectional view of the aircraft depicted in FIG. 1 along axis A—A with the outboard member rotated clockwise about the longitudinal Y-axis.
Figure 5:
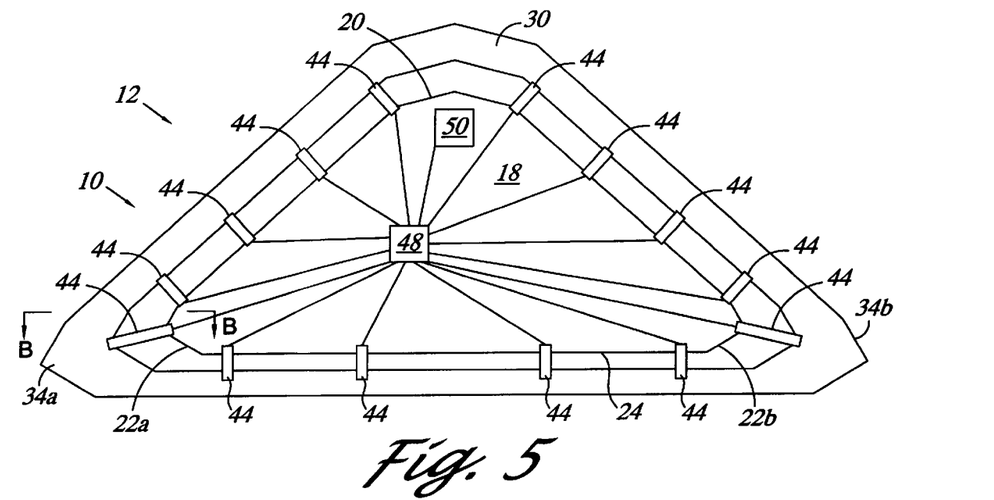
FIG. 5 is an enlarged partial top view of the aircraft of FIG. 1 depicted without the transition section and with symbolically illustrated actuators.

In addition, the aircraft 12 defines a longitudinal axis (Y-axis) and outboard member 30 may be rotated about this axis. Referring now to FIGS. 4 and 8, the outboard member 30 is depicted as rotated about the longitudinal Y-axis of the aircraft 12. This rotational movement results in both yaw and roll control of the aircraft 12. Is has been observed that under conditions this aerodynamic control tends to be dominated by roll control. Generally, as one of ordinary skill in the art can appreciate, yaw control on a wing tends to be primarily a function of aerodynamic drag, whereas roll control tends to be primarily a function of aerodynamic lift.

In order to obtain wind tunnel test data, four aircraft test models were constructed in accordance with the present invention. These test models were similar in configuration to those depicted in FIGS. 1–8. It is contemplated that the aircraft models used to generate the wind tunnel data represent one embodiment of the present invention and is discussed herein for illustrative purposes only. One sub-scale test model was constructed to represent the following full scale dimensions: maximum wingspan (W) of 40 feet parallel to the X-axis; length (L) of 38 feet along the Y-axis; X-Y planar depth (A) of the outboard member 30 of 1 foot; X-Y planar depth (B) of the outboard member 30 of 1.5 feet; X-Y planar depth (C) of the outboard member 30 of 1.5 feet; X-Y planar depth (D) of the transition section 38 of 1 foot; X-Y planar depth (E) of the transition section 38 of 2.5 feet; and X-Y planar depth (F) of the transition section 38 of 2.5 feet; X-Y planar depth (G) of the outboard member 30 of 1.5 feet; and X-Y planar depth (H) of the transition section 38 of 1.5 feet. The model represented a full scale X-Y planar area of approximately 935 square feet.

The test models varied as a function of the deflection of the outboard member 30. The first model was constructed with no deflection. The second and third models were constructed with the entire outboard member 30 vertically deflected six (6) inches upward and downward, respectively. In the fourth test model the rigid outboard member 30 was rotated about the Y-axis such that the distal edge portion 22b was deflected upward six full scale (6) inches and the other distal edge portion 22a was deflected downward six (6) inches.

Referring now to the graph presented in FIG. 9, the vertical axis represents pitching moment coefficient and the horizontal axis represents aircraft angle of attack. As can be seen, three test data curves are plotted. The middle curve represents the pitching moment coefficient of the aircraft model without any deflection of the outboard member 30. The upper curve plots the pitching moment coefficient corresponding to the model with the outboard member 30 deflected upward six (6) inches. The lower curve plots the pitching moment coefficient corresponding to the model with the outboard member 30 deflected downward six (6) inches.

A pitching moment coefficient equal to zero corresponds to an aircraft that is cruising without maneuvering. For example, referring to the middle curve, the data indicates that the aircraft could fly at four degrees angle of attack without any control member movements or deflections because the curve crosses the pitching moment coefficient axis with a value of zero at four degrees of angle of attack.

Referring to the upper curve, the data indicates that the aircraft could fly at twenty-five degrees angle of attack with six inches of upward movement or deflection of the outboard member 30, because the curve crosses the pitching moment coefficient axis with a value of zero at twenty-five degrees of angle of attack. Thus, trimmed flight at any angle of attack between four and twenty-five degrees can be achieved with less than six inches of upward control member movement. Likewise, trimmed flight below four degrees angle of attack can be achieved with less than six inches of downward control member movement.

In addition, the test data indicates that the deviation or spread between the upper and lower curves is relatively constant at a value of approximately 0.2 pitching moment coefficient. Thus, at an angle of attack of −2.5 degrees through 27.5 degrees (a relatively high angle of attack), a flight envelope is available to the aircraft by moving the outboard member 30 up to six inches either up or down. The constant nature of the pitching moment coefficient curves is particularly interesting because it has been observed that with some conventional control surfaces comparable curves tend to converge at high angles of attack.

As mentioned above, wind tunnel test data was obtained from an aircraft model having a outboard member 30 rotated about the Y-axis such that the lateral edge 26a was deflected upward six (6) inches and the other lateral edge 26b was deflected downward six (6) inches. Test data for this model are presented in FIGS. 10 and 11. Referring now to the graph presented in FIG. 10, the vertical axis represents delta yawing moment coefficient and the horizontal axis represents aircraft angle of attack. The delta yawing moment coefficient represents that difference between the yawing moment coefficient with and without control member deflection. Referring now to the graph presented in FIG. 11, the vertical axis represents delta rolling moment coefficient and the horizontal axis represents aircraft angle of attack. The delta rolling moment coefficient represents that difference between the rolling moment coefficient with and without outboard member deflection.

Figure 13:
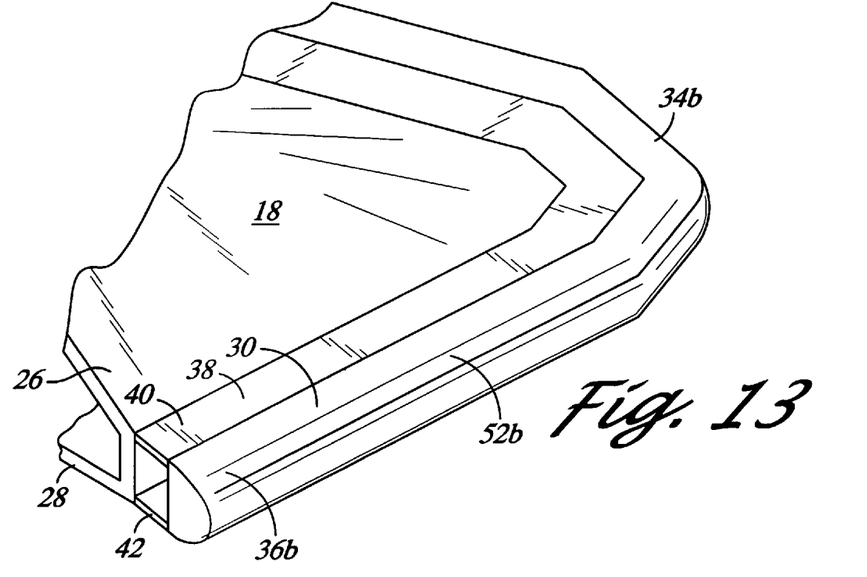
FIG. 13 is an enlarged partial elevated rear perspective view of the starboard side of the embodiment of the aerodynamic control device of the present invention of FIG. 1, depicting the deflectable segment of the trailing edge portion in an undeflected position.
Figure 14:
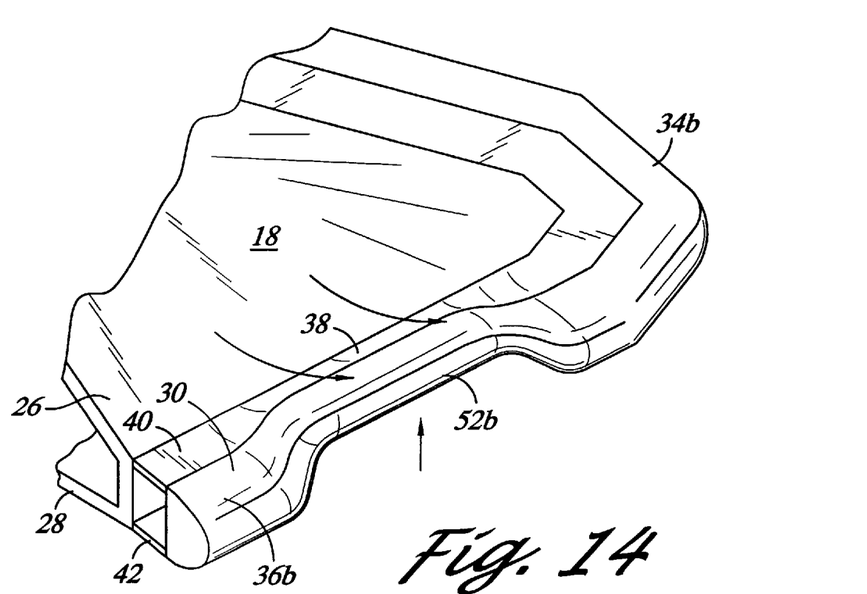
FIG. 14 is a similar view the aerodynamic control device of the present invention as shown in FIG. 13, depicting the deflectable segment of the trailing edge portion moved upward.
Figure 15:
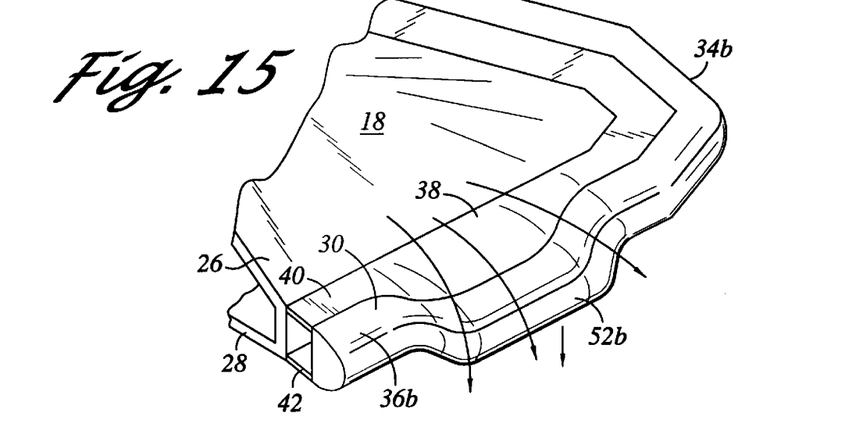
FIG. 15 is a similar view the aerodynamic control device of the present invention as shown in FIG. 13, depicting the deflectable segment of the trailing edge portion moved downward.
Figure 16:
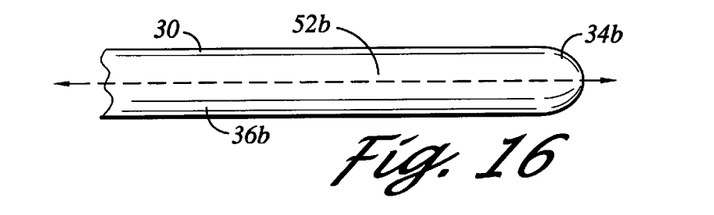
FIG. 16 is a rear symbolic view of the outboard member which corresponded to the aerodynamic control device depicted in FIG. 13.
Figure 17:
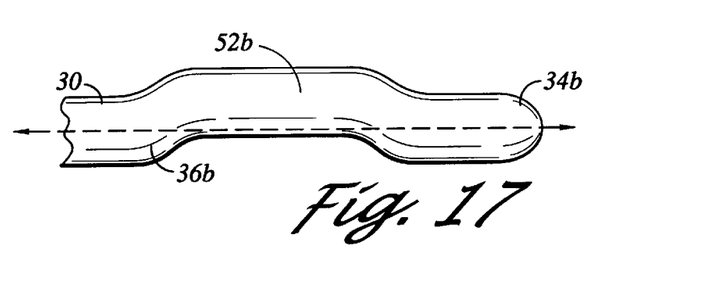
FIG. 17 is a rear symbolic view of the outboard member which corresponded to the aerodynamic control device depicted in FIG. 14.
Figure 18:
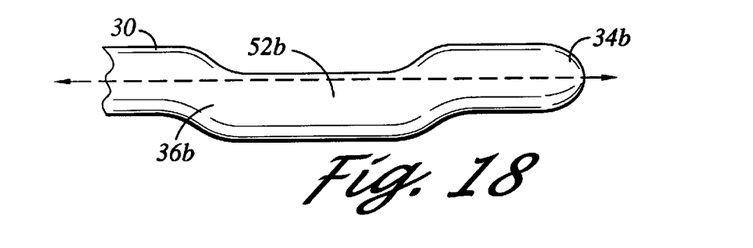
FIG. 18 is a rear symbolic view of the outboard member which corresponded to the aerodynamic control device depicted in FIG. 15.

As mentioned above, the trailing edge portion 36 is provided with at least one deflectable segment 52. Preferably, there is provided a pair of deflectable segments 52a–b which are symmetrically disposed about respective sides of the longitudinal axis Y-axis of the aircraft 12. Referring now to FIG. 13 there is depicted an enlarged partial elevated rear perspective view of the starboard side of the embodiment of the aerodynamic control device of the present invention of FIG. 1. The deflectable segment 52b of the trailing edge portion 36 is in an undeflected position. FIG. 14 is a similar view as that depicted in FIG. 13, however, the deflectable segment 52b is shown as being deflected in a vertically upward position. FIG. 14 is a similar view as that depicted in FIG. 13, however, the deflectable segment 52b is shown as being deflected in a vertically downward position. FIGS. 16–18 respectively depict rear views of that portion of the outboard member 30 depicted in FIGS. 13–15.

The deflectable segments 52a–b are configured to deflect or move cooperatively, either in the same vertical direction or opposing directions. Such movement is contemplated to impact the aerodynamic lift characteristics thereat without significantly impacting drag characteristics. Where the deflectable segments 52a–b are both deflected in the same direction and in the same amount of deflection, it is contemplated that such contouring of the aerodynamic surface contour thereat facilitates pitch control of the aircraft 12 which is substantially independent of roll and yaw control.

Moreover, where the deflectable segments 52a–b are deflected in opposing vertical directions, such contouring of the aerodynamic surface contour thereat facilitates roll control of the aircraft 12 which is substantially independent of pitch and yaw control.

As discussed above, the aggregate rotation of the outboard member 30, as depicted FIGS. 4 and 8, results in yaw and roll control which is dominated by roll control. Significantly, the present invention recognizes that by combining the rotation of the outboard member 30 with selective deflection of the deflectable segments 52a–b yaw control of the aircraft 12 which is substantially independent of pitch and roll control. In this respect, it is contemplated that the rotation of the outboard member 30 about the Y-axis of the aircraft 12 facilitates a rolling moment in an opposing rotational direction. Furthermore, the opposing vertical deflections of the deflectable segments 52a–b results in a generally rotational movement of the deflectable segments 52a–b about the Y-axis of the aircraft 12 which facilitates a rolling moment in a opposing rotational direction. As such, by rotating the outboard member 30 in a clockwise direction and the deflectable segments 52a–b in a counterclockwise direction opposing rolling moments are produced. As such, the overall impact on roll control may be negated. As the deflection of the deflectable segments 52a–b does not significantly impact the relative disparity in drag characteristics associated with both sides of the aircraft 12, the above combination of rotations resulting in a net impact only on relative disparity in drag characteristics associated with both sides of the aircraft 12 introduced by the overall rotation of the outboard member 30 relative to the inboard lifting member 18. As such, the control device 10 of the present invention may advantageously facilitate yaw control which is substantially independent of roll and pitch control.

In addition, there is provided a method of aerodynamic control of an aircraft 10 comprising the initial step providing an aircraft 10 as disclosed above. Aerodynamic control of the aircraft 10 is achieved by selectively moving the leading, trailing and lateral edge portions 32, 34a–b, 36 of the outboard member 30 relative to the inboard lifting member 18 and the deflectable segments 52a–b thereby contouring the airfoil surface. The outboard member 30 and deflectable segments 52a–b are selectively moved relative to the inboard lifting member 18 for selectively achieving pitch, yaw and roll control.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. An aerodynamic control device for integrated use with an aircraft having an inboard lifting member having a leading edge, a pair of opposing distal edges and a trailing edge, the aerodynamic control device comprising:

a movable outboard member extending substantially about the leading, distal and trailing edges of the inboard lifting member and spaced apart therefrom, the outboard member having a leading edge portion, a pair of opposing distal edge portions, and a trailing edge portion, the leading, trailing and distal edge portions being movable in relation to the inboard lifting member to form an deformable airfoil surface extending about the inboard lifting member and the outboard member for achieving aerodynamic control of the aircraft, the trailing edge portion having at least one deflectable segment which is vertically movable in relation to the leading and distal edge portions for achieving aerodynamic control of the aircraft.

2. The aerodynamic control device of claim 1 wherein the at least one deflectable segment comprises a pair of deflectable segments.

3. The aerodynamic control device of claim 2 wherein the inboard lifting member defines a longitudinal axis, the deflectable segments are symmetrically disposed about the longitudinal axis.

4. The aerodynamic control device of claim 2 wherein the deflectable segments are sized and configured to move in opposing vertical directions.

5. The aerodynamic control device of claim 2 wherein the deflectable segments are sized and configured to move in the same vertical direction.

6. The aerodynamic control device of claim 1 wherein outboard member is formed of a material capable of sustaining an elastic strain of at least 5 percent for facilitating a movement of the at least one deflectable segment of the trailing edge portion.

7. The aerodynamic control device of claim 1 further comprises a flexible transition section extending between the inboard lifting member and the outboard member to form a generally uninterrupted airfoil surface extending about the inboard lifting member and the outboard member for achieving aerodynamic control of the aircraft.

8. The aerodynamic control device of claim 1 wherein the transition section comprises upper and lower portions extending between the outboard member and the inboard lifting member to form a generally uninterrupted airfoil surface extending about the inboard lifting member and the outboard member for achieving aerodynamic control of the aircraft.

9. The aerodynamic control device of claim 1 wherein the transition section comprises an elastomeric material.

10. The aerodynamic control device of claim 1 further comprising a plurality of actuators for selectively moving the at least one deflectable segment of the trailing edge portion.

11. The aerodynamic control device of claim 1 further comprising a plurality of actuators mechanically coupling the outboard member to the inboard lifting member for selectively moving the outboard member relative to the inboard lifting member.

12. The aerodynamic control device of claim 1 wherein the inboard lifting member defines a vertical axis, the outboard member is sized and configured to translate parallel to the vertical axis.

13. The aerodynamic control device of claim 1 wherein the leading and trailing edge portions of the outboard member are sized and configured to move in opposing directions relative to the inboard lifting member.

14. The aerodynamic control device of claim 1 wherein the inboard lifting member defines a lateral axis, the outboard member is sized and configured to rotate about the lateral axis.

15. The aerodynamic control device of claim 1 wherein the opposing distal edge portions are sized and configured to move in opposing directions relative to the inboard lifting member.

16. The aerodynamic control device of claim 1 wherein the inboard lifting member defines a longitudinal axis, the actuators are sized and configured to rotate the outboard member about the longitudinal axis.

17. The aerodynamic control device of claim 1 wherein the outboard member is a unitary member.

18. The aerodynamic control device of claim 1 wherein the outboard member laterally spans the inboard lifting member.

19. The aerodynamic control device of claim 1 wherein outboard member is substantially rigid.

20. The aerodynamic control device of claim 1 wherein outboard member comprises a composite resin material.

21. The aerodynamic control device of claim 1 wherein the inboard lifting member comprises a wing.

22. The aerodynamic control device of claim 21 wherein the wing has a pair of opposing wing tips and the distal edge portions of the outboard member are respectively disposed thereat.

23. The aerodynamic control device of claim 21 wherein the wing is delta-shaped.

24. A method of aerodynamic control of an aircraft comprising the steps of:
(a) providing the aircraft with an aerodynamic inboard lifting member having a leading edge, a distal edge and a trailing edge;
(b) forming an airfoil surface by positioning a movable outboard member extending substantially about the leading, distal and trailing edges of the inboard lifting member and spaced apart therefrom, the outboard member having leading, distal and trailing edge portions, the airfoil surface extending about the inboard lifting member and the outboard member;
(c) selectively moving the outboard member relative to the inboard lifting member thereby contouring the airfoil surface for achieving aerodynamic control of the aircraft; and
(d) selectively vertically moving a deflectable segment of the trailing edge portion relative to the leading and trailing edge portions thereby further contouring the airfoil surface for achieving aerodynamic control of the aircraft.

25. The method of aerodynamic control of claim 24 wherein step (d) comprises selectively moving at least one of a pair of deflectable segments of the trailing edge portion, the inboard lifting member having a longitudinal axis, the deflectable segments being symmetrically disposed about the longitudinal axis.

26. The method of aerodynamic control of claim 25 wherein the deflectable segments are moved in opposing directions for generally achieving roll control of the aircraft.

27. The method of aerodynamic control of claim 25 wherein the deflectable segments are moved in the same direction for generally achieving roll control of the aircraft.

28. The method of aerodynamic control of claim 24 wherein the inboard lifting member defines a vertical axis, step (c) comprises moving the outboard member relative to the inboard lifting member along the vertical axis for achieving pitch control of the aircraft.

29. The method of aerodynamic control of claim 24 wherein the inboard lifting member defines a vertical axis, step (c) comprises moving the leading and trailing edge portions of the outboard member in opposing directions relative to the inboard lifting member along the vertical axis for achieving pitch control of the aircraft.

30. The method of aerodynamic control of claim 24 wherein the inboard lifting member defines a longitudinal axis and wherein step (c) comprises rotating the outboard member about the longitudinal axis for achieving yaw control of the aircraft.

31. The method of aerodynamic control of claim 24 wherein the inboard lifting member defines a longitudinal axis, step (c) comprises rotating the outboard member about the longitudinal axis for achieving roll control of the aircraft.

32. The method of aerodynamic control of claim 24 wherein the inboard lifting member defines a longitudinal axis, step (c) comprises rotating the outboard member about the longitudinal axis, step (d) comprises selectively moving a pair of deflectable segments of the trailing edge portion, the inboard lifting member having a longitudinal axis, the deflectable segments being symmetrically disposed about the longitudinal axis.

33. The method of aerodynamic control of claim 32 wherein respective ones of the pair of deflectable segments are generally disposed adjacent respective ones of the distal edge portions, the deflectable segments are generally moved in a direction opposite that of the adjacentmost distal edge portion for achieving yaw control generally independent of roll control of the aircraft.

\* \* \* \* \*